United States Patent [19]

Smiley et al.

[11] 4,232,339
[45] Nov. 4, 1980

[54] TELEVISION SIGNAL HORIZONTAL INTERVAL TIMING RECONSTRUCTION SYSTEM

[75] Inventors: Charles F. Smiley; Billy G. Zachum, both of Quincy, Ill.

[73] Assignee: Harris Corporation, Cleveland, Ohio

[21] Appl. No.: 940,553

[22] Filed: Sep. 8, 1978

Related U.S. Application Data

[63] Continuation of Ser. No. 768,098, Feb. 14, 1977, abandoned.

[51] Int. Cl.³ .......................... H04N 5/06; H04N 5/04
[52] U.S. Cl. ...................................... 358/150; 358/149
[58] Field of Search ................. 358/141, 149, 185, 93, 358/148, 150, 153, 19, 20, 158; 360/37; 331/1 A, 25, 74, 20

[56] References Cited

U.S. PATENT DOCUMENTS

| 3,526,714 | 9/1970 | Fisk et al. .................... 358/158 X |
| 3,688,037 | 8/1972 | Ipn ................................ 358/158 |
| 3,688,316 | 6/1972 | Moskovitz ..................... 358/149 X |
| 3,816,658 | 6/1974 | Vidovic ......................... 358/149 |
| 3,963,877 | 6/1976 | Miyazaki et al. ............. 358/141 |

*Primary Examiner*—Robert S. Tupper
*Assistant Examiner*—Aristotelis M. Psitos

[57] ABSTRACT

A circuit for communicating both a video signal and a timing signal over a single information channel from a television camera head to a remote camera control unit. A horizontal interval timing signal is modified by delaying the beginning of each timing pulse so that each pulse is shortened in duration by a fixed amount. This modified timing signal is added to a video signal such that the portion of the sum signal which corresponds to the modified timing signal has a distinctive amplitude which is outside of the range of amplitudes established by the white and black levels of the video signal. At the camera control unit, a circuit separates the modified timing signal from the sum signal and synchronizes a multi-phase oscillator therewith through use of a phase locked loop. The original timing and video signals are reconstructed through logical operations which use selected phases of the oscillator.

5 Claims, 4 Drawing Figures

TELEVISION SIGNAL HORIZONTAL INTERVAL TIMING RECONSTRUCTION SYSTEM

This is a continuation of application Ser. No. 768,098 filed Feb. 14, 1977, now abandoned.

BACKGROUND AND FIELD OF THE INVENTION

This invention relates to a television camera system and more particularly to a system including means for reducing the number of transmission channels required in communicating video information and timing information from the camera to a remotely located camera control unit.

In a conventional television system camera, the camera head communicates with a remote camera control unit by means of a suitable transmission cable. In the past, transmission cables have been used which have separate conductors for each of the signals which must be communicated between the camera head and the camera control unit. In view of the very large number of these signals, the multiconductor cables were both bulky and expensive.

Current efforts have been directed toward combining as many of the signals as possible so that the composite signal resulting from this combination of signals could then be communicated over a transmission cable having a smaller number of conductors. Preferably, a single composite signal will be generated so that only a single length of coaxial or triaxial cable will be required. Frequency division multiplexing has been used effectively in this regard, but requires the allocation of a separate frequency channel for each signal which must be independently transmitted. Since the attenuation characteristics of coaxial and triaxial cables increases with the frequency of the signal being transmitted thereon, it is desirable to reduce the bandwidth requirement of the signal by reducing the number of frequency channels required. It is therefore desirable to provide a means of combining signals which not only does not require a separate conductor for each of the signals, but also would not require the allocation of a separate frequency channel in a frequency division multiplexing scheme.

Normally, a camera head provides a video signal which is made up of regularly occurring horizontal blanking intervals of fixed duration separated by video information intervals. Each blanking interval is divided into two slots with the first typically containing a white pulse of fixed duration such as 1.5 microseconds. This white pulse will have a signal level which indicates the maximum excursion of the video signal during the video information interval. This white pulse is followed by a black level signal for the duration of the horizontal blanking interval, wherein the balck level indicates the minimum signal which will occur during the video information interval. In addition to the black and white level information, the camera additionally provides a separate camera timing signal which occurs in synchronism with the horizontal blanking interval of the video signal. These camera timing pulses must be communicated to the camera control unit for purposes of synchronizing the operation of each camera head with the standard timing of the control unit involved therewith.

It is therefore a primary object of the present invention to conserve the transmission channel requirements in a television camera system by combining a camera video signal with a modified camera timing signal to form a composite signal which may be communicated over a single channel, with provisions being made at the camera control unit for reconstructing the original signals.

It is a further object of the present invention to provide such a system as discussed above where the composite signal includes video information as well as information representative of maximum white and black levels, together with timing information representative of the beginning and ending of the camera timing pulses.

It is still a further object of the present invention to provide a system for accurately recovering both the camera timing signal and the video signal from the composite signal.

The present invention contemplates the provision of a television camera system wherein a camera employs means for providing a video signal as well as a camera timing signal and in which the video signal includes regularly occurring horizontal blanking intervals of fixed duration separated by video information intervals. It is contemplated that each blanking interval is divided into two successive time slots wherein the signal levels in these time slots represent the maximum and minimum magnitudes of the video information signal. Moreover, it is contemplated that the camera timing signal includes regularly occurring timing pulses each of the same duration as, and synchronized with, a corresponding horizontal blanking interval.

In accordance with the present invention, circuitry is made responsive to each camera timing pulse for purposes of providing a modified horizontal timing pulse having its leading edge delayed by a fixed amount from that of the camera timing pulse and its trailing edge corresponding with that of the camera timing pulse. This camera timing pulse has a signal level outside of the limits established by the white and black signal levels. The video signal is additively combined with these horizontal timing pulses to provide a composite signal for transmission from the camera head to the camera control unit through a single transmission path.

In accordance with another aspect of the present invention, circuitry is provided at the camera control unit for separating the modified horizontal timing pulses from the composite signal. A phase locked loop is provided for synchronizing one phase of a sixteen phase oscillator with the modified timing pulses. Selected phases of the oscillator are logically combined with the modified timing pulses and the composite signal so as to reconstruct the video signal and unmodified horizontal timing signals therefrom.

BRIEF DESCRIPTION OF THE DRAWINGS

The foregoing and other objects and advantages of the invention will become more readily apparent from the following description of the preferred embodiment of the invention as taken in conjunction with the accompanying drawings which are a part hereof and wherein.

DETAILED DESCRIPTION

Figure 1:
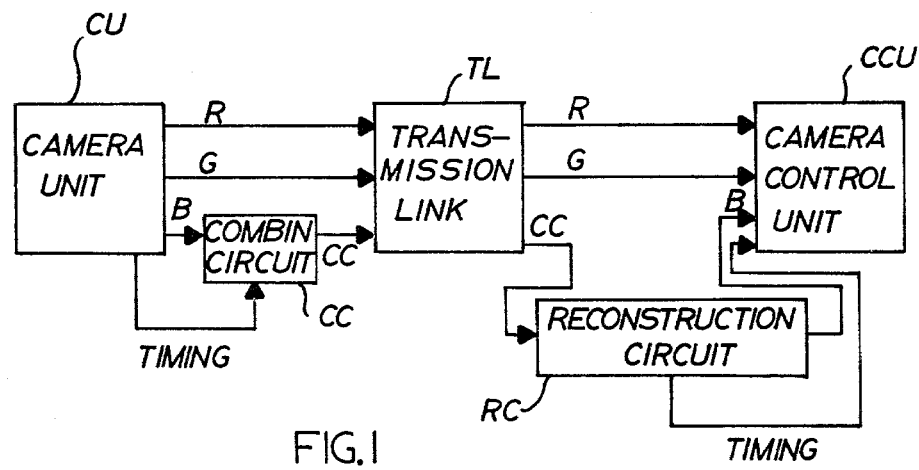
FIG. 1 is a block diagram illustrating a camera system employing the present invention.

Reference is now made to the drawings wherein the showings are for purposes of illustrating a preferred embodiment of the invention only and not for purposes of limiting same. In FIG. 1 there is illustrated a television camera system which employs the present invention. This system includes a camera unit CU which may be remotely located from the camera control unit CCU by means of a suitable transmission link TL. As is conventional, the camera unit provides a video signal and in a color camera unit these video signals include red, green, and blue signals, all of which are transmitted to the camera control unit CCU.

In addition to the video signals, the camera control unit also provides timing information in the form of a horizontal interval timing signal which corresponds in time with the horizontal blanking intervals of the video signals. In accordance with the present invention, this horizontal timing signal is processed for form a modified signal which is then combined with one of the video signals (shown in FIG. 2 as being the blue video signal) by a combining circuit CC. This combined signal, containing information from the blue video signal and the horizontal timing signal is then transmitted over a transmission link TL to a reconstruction circuit RC.

If a number of signals are to be transmitted in discrete frequency channels over a single common length of coaxial or triaxial cable, transmission link TL may include a modulator for modulating the combined signal onto a carrier signal so as to shift the center frequency of the signal into the desired frequency channel. In this event, a demodulator will be included at the other end of the transmission link TL for recovering the combined signal from the modulated signal.

The combined signal will then be processed by a reconstruction circuit RC. Reconstruction circuit RC serves to separate out the modified timing signal from the combined signal, and to use this modified signal to regenerate the horizontal interval timing signal and the blue video signal. These two signals, the blue video signal and the timing signal, will then be directed to a camera control unit CCU for further processing.

Figure 2:
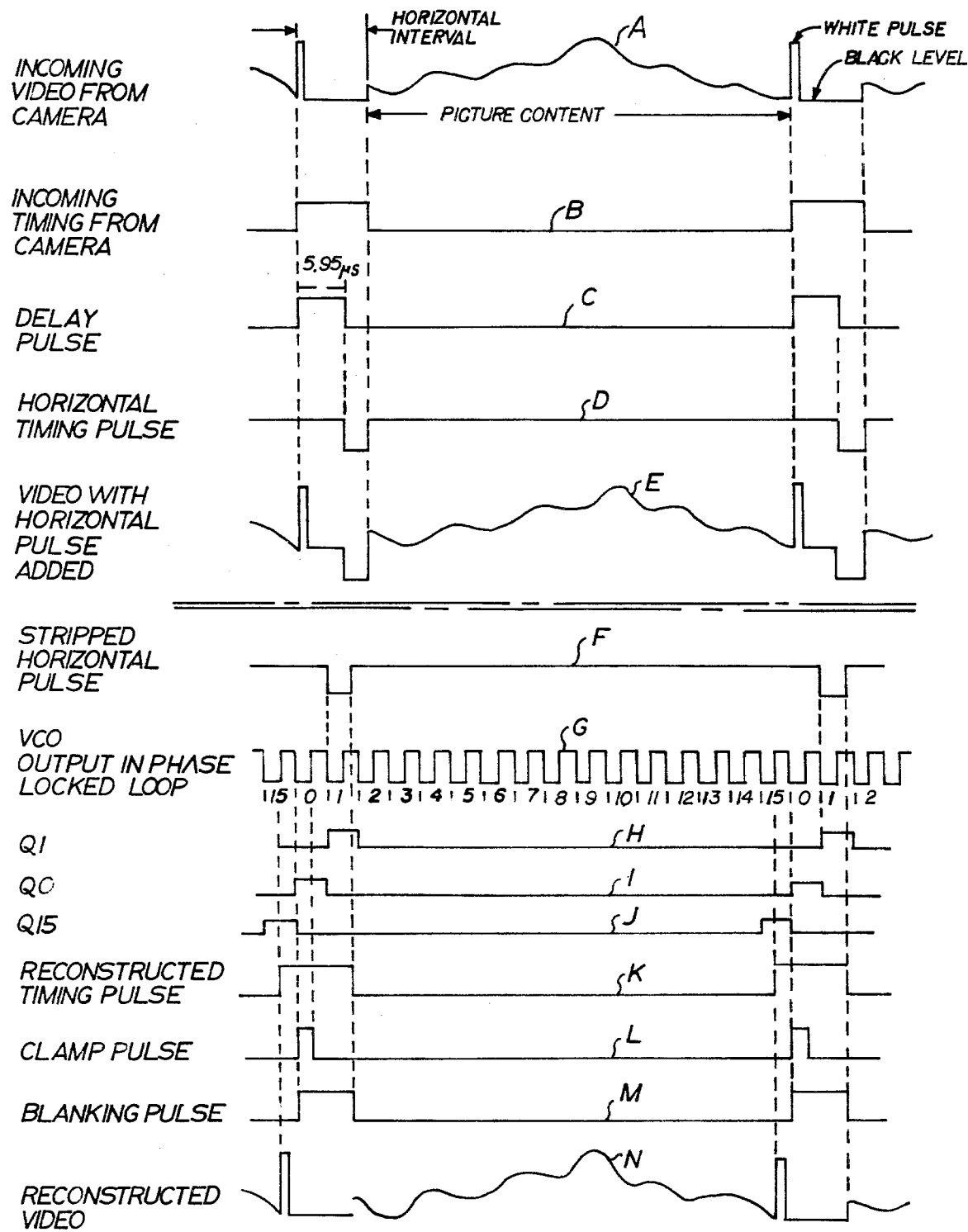
FIG. 2, consisting of A–N, illustrates a plurality of waveforms A–N representative of various operations described herein.

As shown in FIG. 2, the video signal A comprises periodic video intervals containing the picture content of the video signal separated by horizontal blanking intervals. The first portion of each horizontal blanking interval includes a white pulse having an amplitude indicative of the greatest possible amplitude of the video signal during the video interval. For the duration of the horizontal blanking interval, the signal remains at a black level indicative of the lowest possible amplitude of the signal during each video interval.

The horizontal interval timing signal generated by the camera is identified in FIG. 2 by the letter B. It will be seen that this signal is comprised of a periodic sequence of horizontal timing pulses corresponding to the blanking intervals of the video signals generated by the camera. In accordance with the present invention, the horizontal interval timing signal is processed to generate a modified horizontal timing signal D shown in FIG. 2. This modified signal is then combined with the incoming video signal A to generate a composite signal E, which signal thus contains information corresponding to both the video signal and the horizontal interval timing signal.

Figure 3:
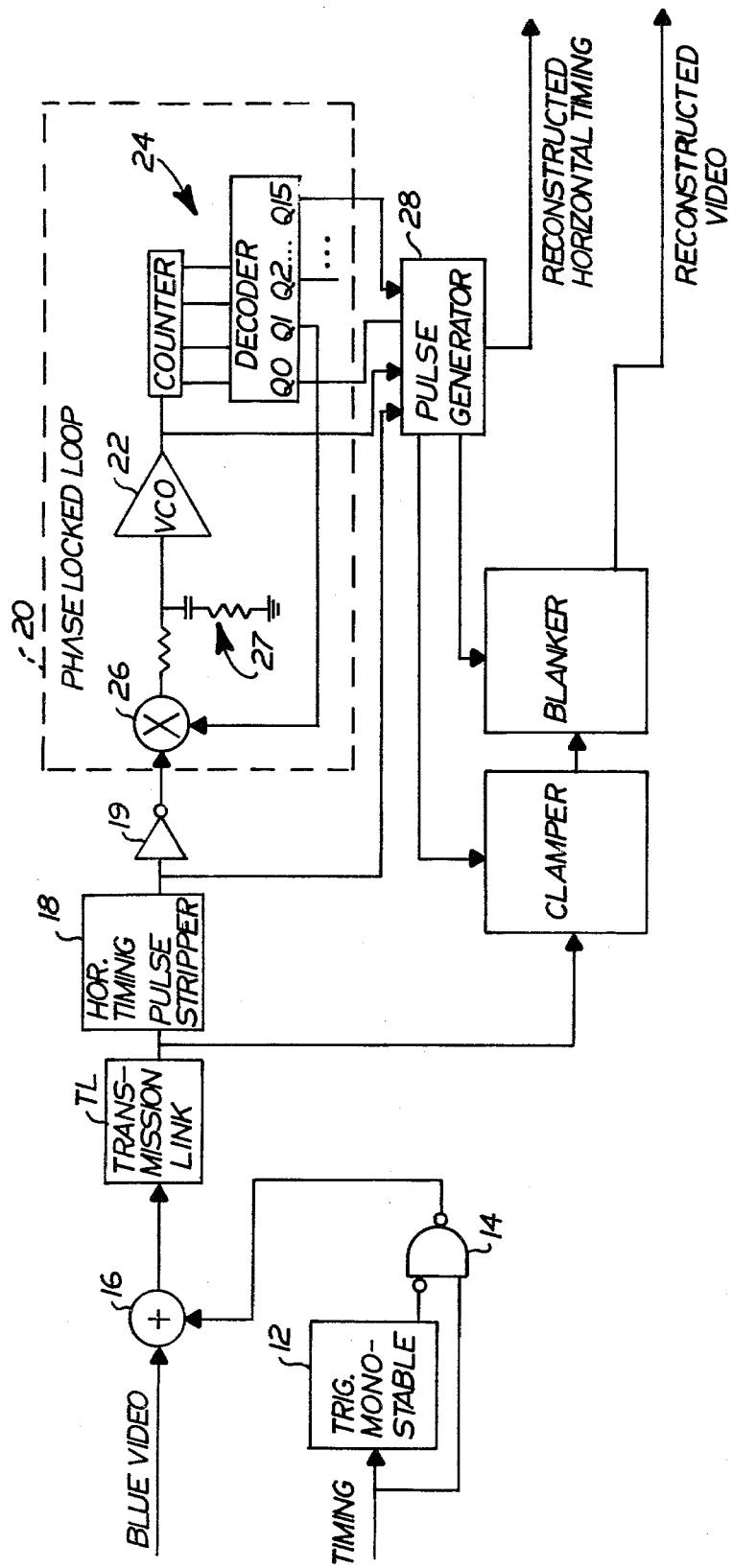
FIG. 3 is a schematic-block diagram illustration of a preferred form of the invention; and, FIG. 4 is a logic diagram of one possible embodiment of the pulse generator block of FIG. 3.

Referring now to FIG. 3, a more detailed block diagram is shown of the combining circuit CC interconnected with a reconstruction circuit RC by means of the transmission link TL. In accordance with the present invention, the incoming horizontal timing signal is processed by a combining circuit 10 which includes a triggerable monostable 12 and a logic gate 14. Triggerable monostable 12 responds to the leading edge of each of the horizontal interval timing pulses to generate a delay pulse (identified by letter C in FIG. 2) having a fixed duration of 5.95 microseconds. This signal serves to disable the passage of the horizontal interval timing pulse B through gate 14. At the conclusion of the 5.95 microsecond delay, however, logic gate 14 will be enabled, and will pass the remainder of the horizontal interval timing pulse. The horizontal interval timing pulse, thus modified, is then additively combined with the incoming video signal by a signal adder circuit 16 to generate the composite signal E shown in FIG. 2. The composite signal thus has an additional pulse occurring during the black level interval which has an amplitude outside of the range of video amplitudes established by the white and black levels.

Following transmission of this combined signal over transmission link TL, a reconstruction circuit RC receives the signal and reconstructs the video and horizontal timing signals therefrom. A horizontal timing pulse stripper 18 is provided in the reconstruction circuit RC which serves to separate the modified horizontal timing pulse from the composite signal. This separation of signals can be readily accomplished because of the distinctive amplitude of the timing pulses. The stripped signal, identified by the letter F in FIG. 2, is then inverted by inverter 19 and directed to a phase locked loop 20 which serves to synchronize the operation of a voltage controlled oscillator (VCO) 22 therewith. In accordance with the present invention, voltage controlled oscillator 22 operates at a frequency which is a high multiple of the frequency of the stripped horizontal pulse. In the disclosed embodiment, the VCO generates 16 pulses for every stripped horizontal pulse. The output of voltage controlled oscillator 22, identified by letter G in FIG. 2, is directed to a 16-line counter/decoder 24 which serves to count the pulses provided by VCO 22 and to decode the counter output with a 1-of-16 decoder. The 16 outputs are thus activated in sequence, with only one output being activated (i.e., in a logic "1" state) at any given time. Since VCO 22 produces a repetitive pulse waveform, the output signal on each output line will similarly be a pulse waveform, and will have a repetition rate 1/16th that of the VCO. Additionally, adjacent outputs will produce sequential pulses in consecutive VCO output cycles. VCO 22 in combination with counter/decoder 24 could thus be viewed as a 16-phase oscillator, wherein each output Q1-Q15 corresponds to a different phase of a single operating cycle. Thus, the three adjacent outputs Q15, Q0, and Q1 (Q15 is considered to be adjacent to Q0 since Q0 will be activated after Q15) will produce the outputs H, I, and J shown in FIG. 2. These three signals are used for synchronizing the operation of the phase locked loop, and for regenerating both the horizontal timing pulse and the video signal. The H output, corresponding to the Q1 output pulse, is supplied to a phase comparator 26 which is responsive to the leading edges of the signals supplied thereto and which serve to compare the phase of the stripped horizontal timing pulse with the phase of the Q1 output of the 16-line counter/decoder 24. The output of phase detector 26 is directed through a low-pass filter 27 to the control input to voltage controlled oscillator 22. In this manner, the operation of the VCO is adjusted by the phase comparator so that the leading edge of the Q1 output pulse occurs simultaneously with the leading edge of the stripped horizontal timing pulse.

The Q0 and Q15 outputs supplied by the 16-line counter/decoder 24, as well as the outputs of voltage controlled oscillator 22 and pulse stripper 18, are directed to a pulse generator 28 which serves to logically combine these signals to provide a black clamp pulse L, a blanking pulse M, and a reconstructed horizontal timing pulse K. Pulse generator 28 will be described in further detail with reference to FIG. 4. With respect to the reconstruction of the horizontal timing pulse, it will be noted that the delay provided by monostable 12 has been selected so that the actual beginning of the horizontal timing interval will be exactly 1½ cycles of VCO 22 prior to the beginning of the modified horizontal timing pulse.

The black level clamp pulse L is directed to a clamping circuit 30 which serves to clamp the DC voltage level of the detected video signal, as indicated by the black level signal selected by the clamping pulse, to the black level of the camera control unit. The blanking pulse M is directed to a blanking circuit 32 which serves to remove the modified horizontal timing signal from the detected video signal by maintaining the detected video signal at the level that it had been at immediately prior to the blanking pulse. Blanking circuit 32 thus provides at its output the reconstructed video signal N shown in FIG. 2.

Figure 4:
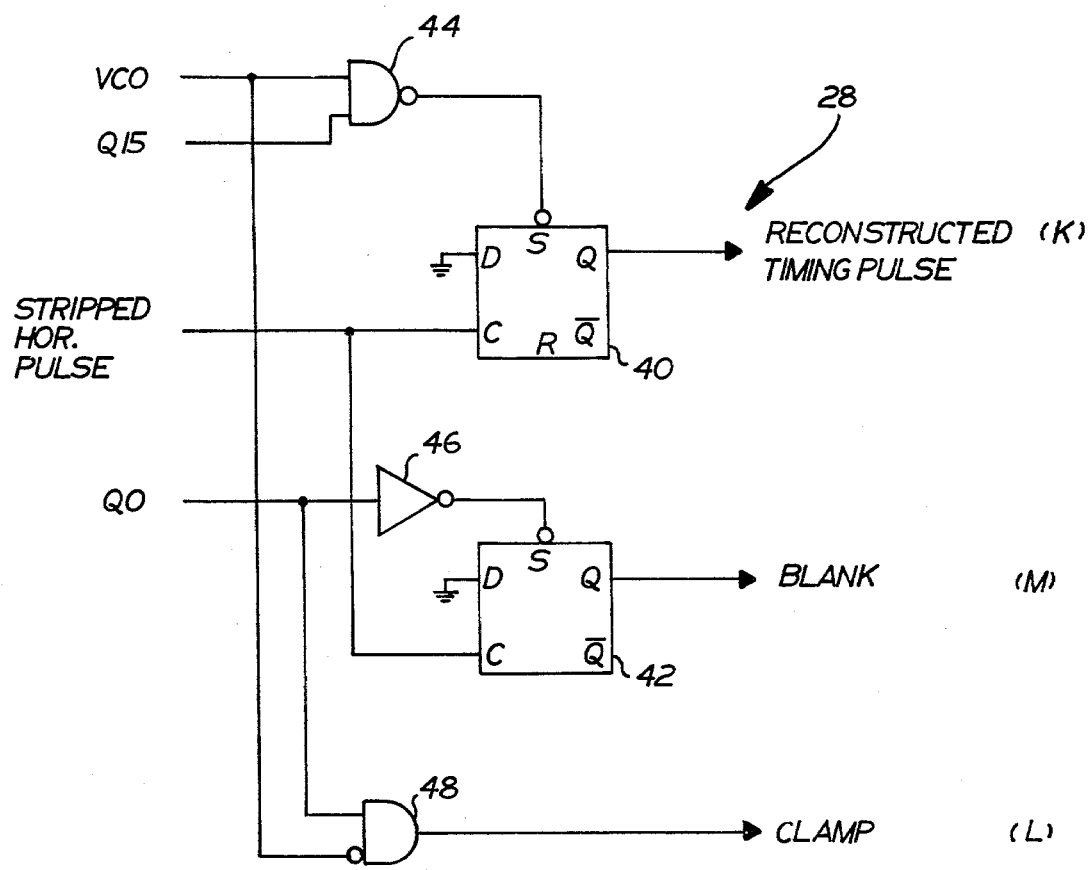

Referring now to FIG. 4, a pulse generator 28 is shown which could be employed with the present invention. Two type "D", positive-edge triggered flip-flops (F/F) 40 and 42 are used for reconstructing the horizontal timing signal and generating the blanking pulse. Each F/F is set when a low level is established on its "set" input. F/F 40 is set at the beginning of the horizontal interval by logically ANDing the VCO output and the Q15 output of counter/decoder 24 by NAND gate 44. This will cause the output of NAND gate 44 to fall to a low voltage level exactly 1½ cycles of VCO 22 prior to the beginning of the stripped horizontal pulse. As stated previously, this timing corresponds to the beginning of the horizontal interval. F/F 42 is set somewhat later in the horizontal interval, after the incoming signal has settled at the black level. The Q10 output of counter/decoder 24 is inverted by inverter 46 to supply a signal which falls to a low voltage level at the proper time. F/F's 40 and 42 are simultaneously reset when a rising transition is presented at their clock inputs C. By connecting the output of pulse stripper 18 to the clock input of each F/F, each will be reset at precisely the conclusion of the horizontal interval. The clamp pulse is generated by ANDing the Q0 output of counter/decoder 24 with the inverse of the VCO output. This is accomplished through use of gate 48. The net results of these operations are the signals shown in FIG. 2 and identified by letters K, L, and M.

Although the invention has been described with respect to a preferred embodiment, it will be appreciated that various rearrangements and alteration of parts may be made without departing from the spirit and scope of the invention as defined in the following claims.

What is claimed is:

1. In a television camera system wherein a camera head generates at least one video signal and a periodic horizontal interval timing signal comprising a periodic train of pulses each having a fixed duration, which signals are to be communicated over a multichannel transmission link to a remote camera control unit, apparatus for communicating said video and timing signals over only a single channel of said multichannel transmission link, comprising:

modifying means for modifying said timing signal so as to provide a periodic modified signal which may be additively combined with said video signal without loss of any information contained therein, said modifying means comprising means for altering said fixed duration of each said pulse by a fixed, preselected amount to provide said modified signal;

combining means for additively combining said modified signal and said video signal so as to provide a sum signal having a periodic portion with a distinctive amplitude and corresponding in time to said modified signal;

transmitting means for transmitting said sum signal to said camera control unit over a single communication channel;

pulse stripping means at said camera control unit responsive to said periodic distinctive portion of said sum signal for regenerating said modified signal therefrom; and, reconstructing means at said camera control unit responsive to said sum signal and to said regenerated modified signal for reconstructing said video and timing signals therefrom;

wherein said means for altering said fixed duration of each pulse comprises delay means responsive to each pulse of said timing signal to provide a delay pulse having its leading edge corresponding in time to the leading edge of the corresponding pulse of said timing signal, but having its trailing edge occurring a predetermined time interval prior to that of said corresponding timing pulse, and means for combining each said delay pulse with its corresponding said timing pulse so as to in each case provide a modified pulse having its leading edge corresponding in time with the trailing edge of said delay pulse and its trailing edge corresponding with the trailing edge of said timing pulse, said modified pulses together forming said modified signal.

2. In a television camera system wherein a camera head generates at least one video signal and a periodic horizontal interval timing signal comprising a periodic train of pulses each having a fixed duration, which signals are to be communicated over a multichannel transmission link to a remote camera control unit, apparatus for communicating said video and timing signals over only a single channel of said multichannel transmission link, comprising:

modifying means for modifying said timing signal so as to provide a periodic modified signal which may be additively combined with said video signal without loss of any information contained therein, said modifying means comprising means for altering said fixed duration of each said pulse by a fixed, preselected amount to provide said modified signal;

combining means for additively combining said modified signal and said video signal so as to provide a sum signal having a periodic portion with a distinctive amplitude and corresponding in time to said modified signal;

transmitting means for transmitting said sum signal to said camera control unit over a single communication channel;

pulse stripping means at said camera control unit responsive to said periodic distinctive portion of said sum signal for regenerating said modified signal therefrom; and, reconstructing means at said camera control unit responsive to said sum signal and to said regenerated modified signal for reconstructing said video and timing signals therefrom;

wherein said reconstructing means comprises phase locked loop means responsive to said regenerated modified signal for generating a plurality of outputs, each synchronized in frequency with said modified signal, but bearing different phase relationships thereto, and means responsive to said plurality of outputs of said phase locked loop means, said sum signal, and said regenerated modified signal for reconstructing said video and timing signals therefrom.

3. In a television camera system having a camera head for providing a video signal and a camera timing signal wherein said video signal includes regularly occurring horizontal blanking intervals of fixed duration separated by video information intervals, each said blanking interval being divided into a first time slot of a signal level representative of the white level of said video signal and a second time slot of a signal level representative of the black level of said video signal, said camera timing signal including regularly occurring camera timing pulses of the same duration as and synchronized with said horizontal blanking intervals; said system also including a camera control unit remote from said camera and cable transmission means defining a single transmission path for signal communication from said camera to said camera control unit; apparatus for communicating said video and timing signals over said single transmission path comprising;

means responsive to each said camera timing pulse for providing a modified timing pulse having its leading edge delayed by a fixed amount from that of said camera timing pulse and its trailing edge corresponding in time with that of said camera timing pulse;

means for additively combining said video signal with said modified timing pulses to provide a composite signal having regularly occurring excursions outside of the limits established by said white and black levels, with said excursions corresponding to said modified timing pulses, for transmission through said single transmission path;

means coupled to said transmission path for receiving said composite signal and responsive to said excursions for recovering said modified timing pulses from said composite signal;

phase locked loop means responsive to said regenerated modified signal for generating a plurality of outputs, each synchronized in frequency with said modified signal, but bearing different phase relationships thereto; and, means responsive to said plurality of outputs of said phase locked loop means, said sum signal, and said regenerated modified signal for reconstructing said video and timing signals therefrom.

4. In a television camera system wherein a camera head generates at least one video signal and a timing signal, with said at least one video signal comprising regularly occurring video information intervals containing information representing a video image and blanking intervals separating said video information intervals, said blanking intervals each containing at least one time slot having a reference signal level therein, and with said timing signal comprising a periodic train of pulses occurring in timed relation to said blanking intervals of said at least one video signal, where said timing and video signals are to be communicated over a multi-channel transmission link to a remote camera control unit, apparatus for communicating said video and timing signals over only a single channel of said multichannel transmission link, comprising:

modifying means for modifying the pulses of said timing signal so as to provide a periodic modified signal which may be additively combined with said video signal without altering said video information or said reference signal level;

combining means for additively combining said modified signal and said video signal so as to provide a sum signal having a periodic portion with a distinctive amplitude and corresponding in time to said modified signal;

transmitting means for transmitting said sum signal to said camera control unit over a single communication channel;

pulse stripping means at said camera control unit responsive to said periodic distinctive portion of said sum signal for regenerating said modified signal therefrom; and, reconstructing means at said camera control unit responsive to said sum signal and to said regenerated modified signal for reconstructing said video and timing signals therefrom.

5. Apparatus as set forth in claim 4 wherein said timing signal comprises a periodic train of pulses each having a fixed duration, and wherein said modifying means comprises means for altering said fixed duration of each pulse by a fixed, preselected amount to provide said modified signal.

* * * * *

UNITED STATES PATENT AND TRADEMARK OFFICE
CERTIFICATE OF CORRECTION

PATENT NO. : 4,232,339
DATED : November 4, 1980
INVENTOR(S) : Charles F. Smiley et al.

It is certified that error appears in the above-identified patent and that said Letters Patent are hereby corrected as shown below:

Item [75] on title page should read:

"Inventors: Charles F. Smiley; Billy G. Yochum, both of Quincy, Ill."

Signed and Sealed this

Seventh Day of April 1981

[SEAL]

Attest:

RENE D. TEGTMEYER

Attesting Officer     Acting Commissioner of Patents and Trademarks